United States Patent [19]
Ueno et al.

[11] Patent Number: 5,393,040
[45] Date of Patent: Feb. 28, 1995

[54] HYDRAULIC DAMPING DEVICE

[75] Inventors: Masato Ueno; Takashi Maeno, both of Inazawa, Japan

[73] Assignee: Toyoda Gosei Co., Ltd., Nishikasugai, Japan

[21] Appl. No.: 76,187

[22] Filed: Jun. 14, 1993

[30] Foreign Application Priority Data

Jul. 1, 1992 [JP] Japan ................................. 4-197530

[51] Int. Cl.⁶ ............................................. F16F 13/00
[52] U.S. Cl. ................................ 267/140.13; 248/550
[58] Field of Search .................... 267/140.11, 140.13, 267/219, 35, 141.2, 141.3, 141.4, 141.5; 248/562, 636, 550

[56] References Cited

U.S. PATENT DOCUMENTS

| | | | |
|---|---|---|---|
| 4,867,263 | 9/1989 | Sugino et al. | 267/140.13 X |
| 5,139,241 | 8/1992 | Hamaekers et al. | 267/140.11 X |
| 5,172,893 | 12/1992 | Bouhier et al. | 267/140.11 X |

FOREIGN PATENT DOCUMENTS

| | | | |
|---|---|---|---|
| 0179543 | 9/1985 | Japan | 267/140.11 |
| 63-195441 | 8/1988 | Japan . | |
| 2253027 | 10/1990 | Japan | 267/140.11 |

*Primary Examiner*—Robert J. Oberleitner
*Assistant Examiner*—Peter M. Poon
*Attorney, Agent, or Firm*—Cushman, Darby & Cushman

[57] ABSTRACT

A hydraulic damping device is provided including a housing having a first main liquid chamber defined in part by a rubber body which expands and contracts upon input of vibrations in a vertical direction, a second main liquid chamber defined in part by a rubber body which expands and contracts upon input of vibrations in a horizontal direction, and an auxiliary liquid chamber defined in part by a rubber film, which communicates with the first and second main liquid chambers through passageways. Upon input of vibrations in a vertical direction, one or more valves opens the passageway communicating with the first main liquid chamber and closes the passageway communicating with the second main liquid chamber to force a damping liquid filled within the first main liquid chamber to flow into the auxiliary liquid chamber, thereby damping vibrations in a vertical direction. Upon input of vibrations in a horizontal direction, the valve(s) closes the passageway communicating with the first main liquid chamber and opens the passageway communicating with the second main liquid chamber to force the damping liquid within the second main liquid chamber to flow into the auxiliary liquid chamber, thereby damping vibrations in a horizontal direction.

16 Claims, 2 Drawing Sheets

HYDRAULIC DAMPING DEVICE

BACKGROUND OF THE INVENTION

1. Field of the Invention

The present invention relates to a hydraulic damping device for effectively damping vibrations input in various directions.

2. Description of Related Art

A conventional hydraulic damping device is generally composed of an elastic rubber body which supports a vibrating body such as an engine. The elastic rubber body defines a liquid chamber filled with a damping liquid. The volume of the liquid chamber changes upon input of vibrations from the vibrating body. The hydraulic damping device dampens the vibrations by forcing the damping liquid to flow into, or out of, the liquid chamber through a throttled passageway.

With conventional hydraulic damping devices, upon input of vibrations in a vertical direction, which corresponds to the vibrating body supporting direction, the volume of the liquid chamber effectively changes. Thus, a large damping force can be obtained to dampen the vibrations. However, upon input of vibrations in a horizontal direction, the volume of the liquid chamber does not appreciably change. Therefore, a sufficient damping force cannot be obtained to effectively dampen horizontal vibrations, and accordingly, high stability and controllability cannot be achieved.

SUMMARY OF THE INVENTION

It is an object of the present invention to provide a hydraulic damping device for effectively reducing and dampening vibrations input in various directions, including the direction in which a vibrating body is supported.

The hydraulic dampening device of the present invention includes a housing which is adapted to be secured to a base body. The housing has at least one first main liquid chamber defined in part by a first member which expands and contracts upon input of vibrations in a vertical direction, at least one second main liquid chamber defined in part by a second member which expands and contracts upon input of vibrations in a horizontal direction, an auxiliary liquid chamber defined in part by a third member which complementarily deforms due to the expansion and contraction of the first and second members. The auxiliary liquid chamber is filled with a damping liquid which is forced to flow into and out of the first main liquid chamber and the second main liquid chamber. A first passageway is provided for interconnecting the first main liquid chamber and the auxiliary liquid chamber. A second passageway is provided for interconnecting the second main liquid chamber and the auxiliary liquid chamber. At least one valve member is also provided for changing openings of the first and second passageways.

With the hydraulic damping device of the present invention, upon vibrations input in a vertical direction, the valve member opens the first passageway by a predetermined amount, whereas the second passageway is fully closed. As a result, the damping liquid within the first main liquid chamber is forced to flow into the auxiliary liquid chamber through the first passageway, thereby effectively damping vibrations input in the vertical direction.

Upon vibrations input in a horizontal direction, the valve member fully closes the first passageway, whereas the second passageway is opened by a predetermined amount. As a result, the damping liquid within the second main liquid chamber is forced to flow into the auxiliary liquid chamber through the second passageway, thereby effectively damping vibrations input in the horizontal direction.

Upon input of vibrations in an oblique direction, the valve member respectively open the first and second passageways by predetermined amounts. As a result, the damping liquid within the first and second main liquid chambers is forced to flow into the auxiliary liquid chamber through the first and second passageways, thereby effectively damping vibrations input in the oblique direction.

In accordance with another feature of the invention, the first passageway and the second passageway are joined and the valve member is provided at the intersection of the two passageways.

In accordance with a further feature of the invention, the hydraulic damping device further includes control means which controls the operation of the valve member in accordance with the vibration-inputting direction.

In accordance with another feature of the invention, the first member defining one of the at least one first main liquid chamber is composed of a cup-shaped, thick-walled, elastic rubber body.

In accordance with an additional feature of the invention, the first member and the second member are coupled to each other by a coupling member so that one of the members is connected to the vibrating body.

In accordance with yet another feature of the invention, the housing defines a horizontal plane and a vertical plane, and the first main liquid chamber is provided along the horizontal plane while the second main liquid chamber is provided along the vertical plane.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
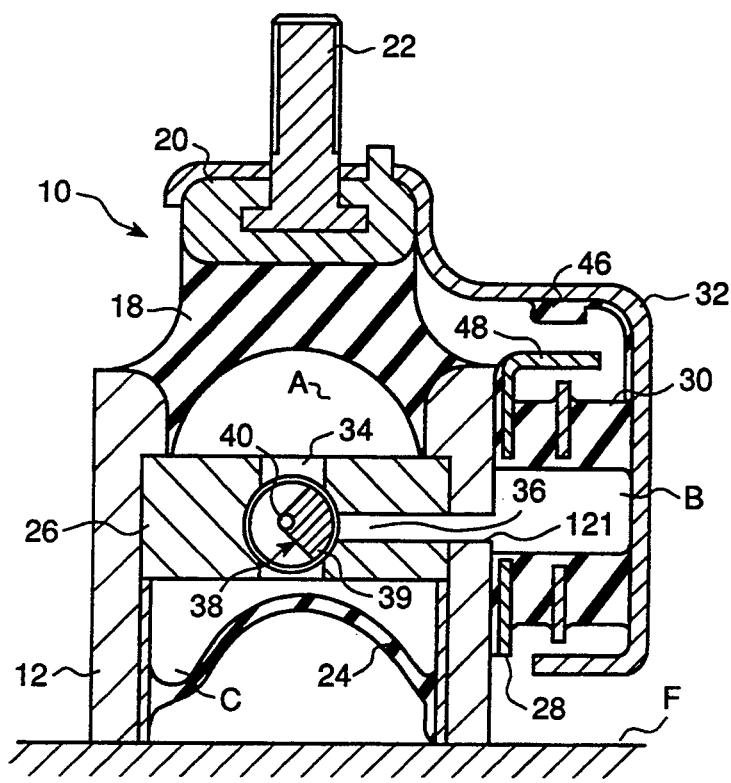
FIG. 1 is a longitudinal sectional view of a hydraulic damping device provided in accordance with the principle of the present invention, shown with the valve member disposed in a position so as to dampen vertical vibrations.
Figure 2:
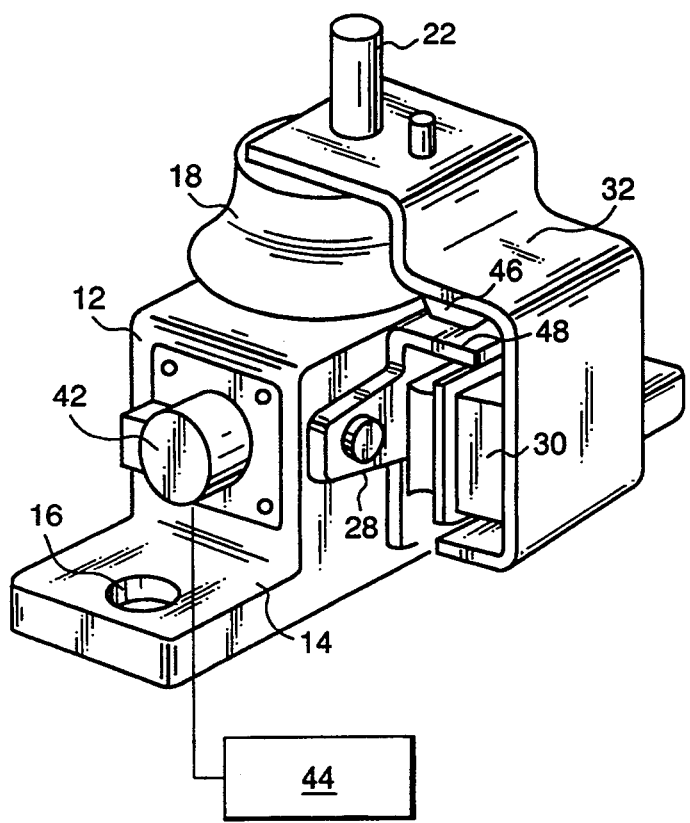
FIG. 2 is a perspective view of the hydraulic damping device shown in FIG. 1.

In FIGS. 1 and 2, a hydraulic damping device 10 is shown which includes a hollow housing 12 having a generally rectangular cross-section. A flange 14 (FIG. 1) projects from a lower end of one side wall of the housing 12. The hollow housing 12 is secured to a base body such as a vehicle frame F utilizing the flange 14, by inserting a bolt (not shown) through a through-hole 16 formed in the flange 14.

A cup-shaped, thick-walled, elastic rubber body 18 which opens downwardly is secured to an upper edge of the housing 12 so as to close an upper opening thereof. An upper plate 20 is secured to a top surface of the elastic rubber body 18. A vibrating body, such as a vehicle engine, is mounted on the upper plate 20 by a bolt 22.

A freely deformable, thin rubber film 24 is provided within the housing 12 so that an outer periphery of the thin rubber film 24 is joined to an inner periphery of the lower end of the housing 12. The closed space defined between the elastic rubber body 18 and the thin rubber film 24 is filled with a damping liquid. This closed space is divided into an upper space and a lower space by a thick partition wall 26, which is secured to the housing so as to be substantially vertically centered within the housing 12, thereby defining a main liquid chamber A and an auxiliary liquid chamber C.

A cylindrical, thick-walled, elastic rubber body 30 is secured to one side wall of the housing 12 through a base plate 28 so as to project from the side wall of the housing 12. A coupling plate 32, which extends from the upper plate 20 downwardly along the side wall of the housing 12, is secured to an end surface of the elastic rubber body 30, thereby closing an end portion of the housing. The inner space of the elastic rubber body 30 defines a main liquid chamber B.

Passageways 34 and 36 are defined within the partition wall 26. The passageway 34 penetrates the partition wall 26 in a vertical direction, thereby interconnecting the main liquid chamber A and the auxiliary liquid chamber C. The passageway 36 extends from the side wall of the partition wall 26 in a horizontal direction and joins passageway 34. In the side wall of the housing 12, a through-hole 121 is defined so as to communicate with passageway 36, thereby interconnecting the main liquid chamber B and the auxiliary liquid chamber C.

At the intersection of the two passageways 34 and 36, a rotary valve member 38 having a fan-shaped member 39 is provided. A drive shaft 40 is provided so as to penetrate the pivot of the fan-shaped member 39 of the rotary valve member 38. The drive shaft 40 is driven to turn to a predetermined position by an electromagnetic coil 42 (FIG. 2) provided on the outer wall of the housing 12. An arc-shaped outer periphery of the fan-shaped member 39 changes the opening of each of the passageways 34 and 36.

The electromagnetic coil 42 is electrically connected to control means 44 which controls rotation of the drive shaft 40 by selectively directing an electric current to the electromagnetic coil 42 in accordance with the vibration-inputting direction.

A stopper rubber member 46 is provided on the lower surface of the coupling plate 32 in a horizontally bent portion thereof so as to be opposed to a horizontally projecting portion 48 of the base plate 28. A space is defined between the rubber member 46 and the projecting portion 48. The stopper rubber member 46 prevents the elastic rubber body 18 from being excessively deformed upon input of the vibrations in a vertical direction, since travel of the horizontally projecting portion 48 is stopped upon contact with the rubber member 46.

An end of the horizontally projecting portion 48 of the base plate 28 is spaced apart from the vertical portion of the coupling plate 32 by a predetermined distance, thereby preventing the elastic rubber body 30 from being excessively deformed upon input of vibrations in a horizontal direction, since travel of the projecting portion 48 is stopped upon contact with the portion of rubber stopper 46 which portion is disposed on the vertical portion of the coupling plate 32.

When vibrations are input from an engine or the like to the hydraulic damping device of the invention in a vertical direction, the electromagnetic coil drives the drive shaft 40 so that the fan-shaped member 39 is turned to the position illustrated in FIG. 1. Thus, passageway 34 is opened and passageway 36 is closed. As a result, the damping liquid within the main liquid chamber A flows into the auxiliary liquid chamber C due to the input of vibrations, thereby effectively damping vibrations in a vertical direction.

Figure 3:
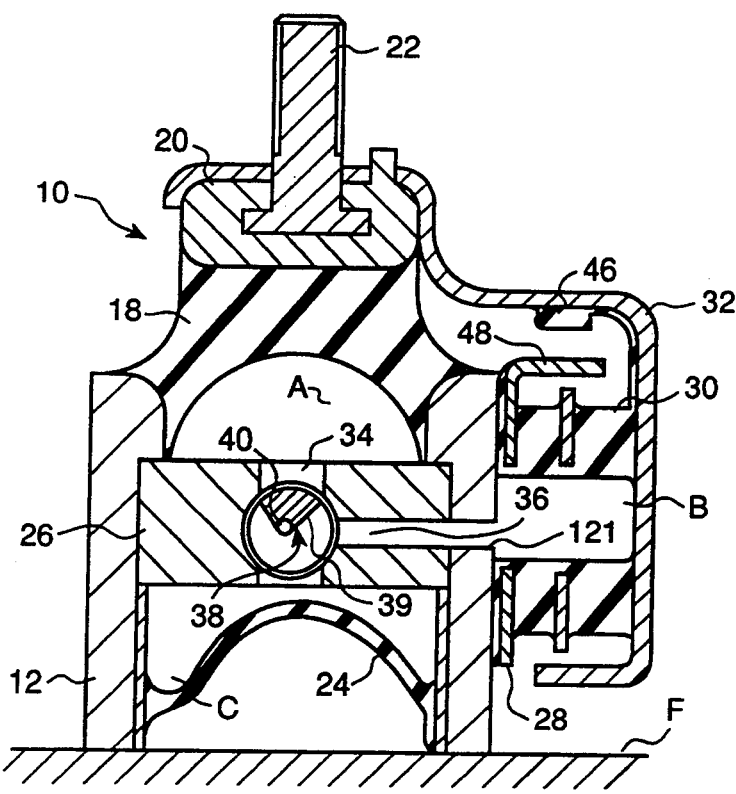
FIG. 3 is a sectional view of the hydraulic damping device shown with the valve member disposed so as to dampen horizontal vibrations.

When vibrations are input from an engine or the like to the hydraulic damping device of the invention in a horizontal direction, the electromagnetic coil drives the drive shaft 40 so that the fan-shaped member 39 is turned to the position illustrated in FIG. 3. Thus, passageway 34 is closed and passageway 36 is opened. As a result, the damping liquid within the main liquid chamber B flows into the auxiliary liquid chamber C due to the input of vibrations, thereby effectively damping vibrations in a horizontal direction.

Thus, in damping vibrations, the rubber film 24 complementarily deforms with expansion and contraction of rubber body 18 and rubber body 30.

The present invention is not limited to the preceding embodiment. Other modifications are possible such as the following:

Passageway 34 or 36 need not necessarily be fully opened. They may be partially opened by a predetermined amount.

Figure 4:
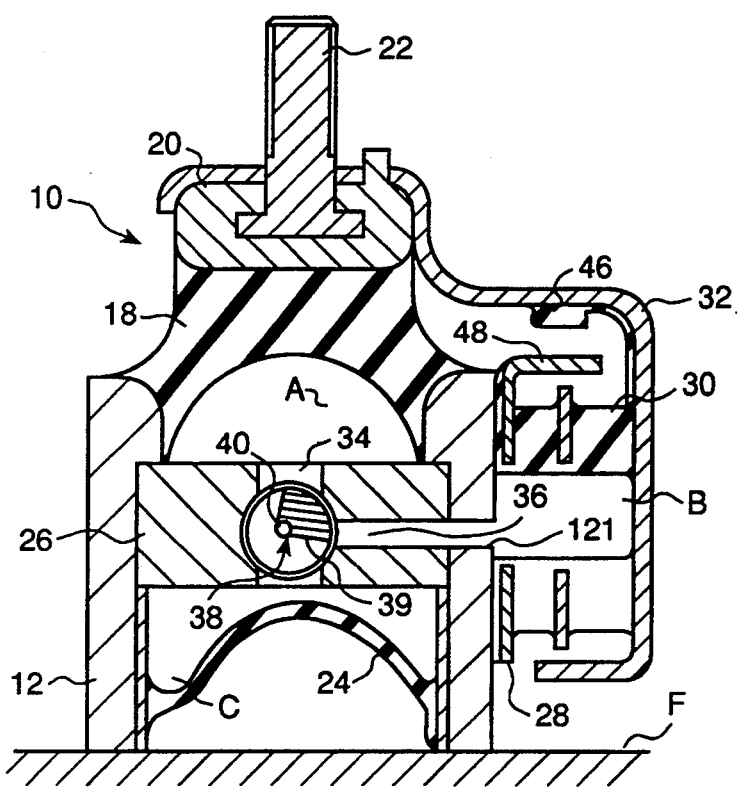
FIG. 4 is a sectional view of the hydraulic damping device shown with the valve member disposed so as to dampen vibrations directed in oblique directions.

Furthermore, by selecting the configuration of the fan-shaped member 39, both passages 34 and 36 can be opened by predetermined amounts, as shown in FIG. 4. In this case, upon input of vibrations, the damping liquid within the main liquid chambers A and B can be forced to flow into the auxiliary liquid Chamber C by way of passageways 34 and 36, whereby the vibrations input in an oblique direction can be sufficiently damped.

The number of the main chambers is not limited to two. A plurality of main liquid chambers can be provided along the vertical plane and the horizontal plane of the housing.

The passageways interconnecting the main liquid chambers A and B and the auxiliary liquid chamber C can be provided in a member other than the partition wall 26. The passageway may be provided independently, without being joined. In this case, a valve member 38 is provided in each of the mutually independent passageways.

Further, the valve member for opening and closing the passageway may be previously set so as to open the passageway by a predetermined amount.

The walls defining the main liquid chambers A and B may be respectively connected to the vibrating body without using a coupling member.

The housing 12 may take any cross-sectional shape other than the rectangular cross-section.

As described above, the hydraulic damping device in accordance with the present invention effectively dampens vibrations input in various directions. Therefore, the device of the present invention is suitable for an engine mounting. In that regard, booming noise can be reduced, and stability and controllability can be improved.

While the invention has been described in connection with what is presently considered to be the most practical and preferred embodiments, it is to be understood that the invention is not limited to the disclosed embodiments, but, on the contrary, is intended to cover various modification and equivalent arrangements included within the spirit and scope of the appended claims.

What is claimed is:

1. A hydraulic damping device comprising:
   a housing adapted to be secured to a base body;
   first surfaces defining at least one first main liquid chamber within said housing, a first member defining at least one of said first surfaces, said first member expanding and contracting upon input of vibrations in a vertical direction;
   second surfaces defining at least one second main liquid chamber within said housing, a second member defining at least one of said second surfaces, said second member expanding and contracting upon input of vibrations in a horizontal direction;
   third surfaces defining an auxiliary liquid chamber within said housing, a third member defining at least one of said third surfaces, said third member complementarily deforming with expansion and contraction of said first member and said second member, said auxiliary liquid chamber being filled with a damping liquid, said damping liquid being forced to flow one of into and out of said first main liquid chamber and said second main liquid chamber upon vibration input;
   means defining a first passageway for connecting said first main liquid chamber and said axillary liquid chamber;
   means defining a second passageway for connecting said second main liquid chamber and said auxiliary liquid chamber; and
   valve means coupled to said first and second passageways for changing openings of said passageways in response to the vibration input, said first passageway and said second passageway being joined, said valve means being disposed at an intersection of said first passageway and said second passage way.

2. The hydraulic damping device according to claim 1, further comprising control means for controlling operation of said valve means in accordance with an input direction of vibration.

3. The hydraulic damping device according to claim 2, wherein said control means includes an electromagnetic coil.

4. The hydraulic damping device according to claim 1, wherein said first member is a cup-shaped, thick-walled, elastic rubber body which supports a vibrating body.

5. The hydraulic damping device according to claim 1, wherein said first member and said second member are coupled to each other by a coupling member, one of said first and second members being connected to a vibrating body.

6. The hydraulic damping device according to claim 1, wherein said housing defines a horizontal plane and a vertical plane, said first main liquid chamber being disposed along said horizontal plane and said second main liquid chamber being disposed along said vertical plane.

7. The hydraulic damping device according to claim 6, wherein said housing is of a cylindrical shape and is disposed on the base body, said first member closes an upper open end of said housing which is disposed along said horizontal plane, thereby defining said first main liquid chamber within said cylindrical housing, and said second member is disposed on one side wall of said cylindrical housing.

8. The hydraulic damping device according to claim 7, wherein a partition wall is provided within said cylindrical housing so as to divide an inner space thereof into an upper space and a lower space, said first main liquid chamber being defined in said upper space, said third member being a freely deformable film provided across said lower space, thereby defining said auxiliary liquid chamber on a lower side of said partition wall.

9. The hydraulic damping device according to claim 8, wherein said first passageway and said second passageway are defined in said partition wall.

10. The hydraulic damping device according to claim 9, wherein said first passageway and said second passageway are joined, said valve means being disposed at an intersection of said first passageway and said second passageway.

11. The hydraulic damping device according to claim 10, wherein said first passageway is defined so as to penetrate said partition wall in a vertical direction, and said second passageway extends from one side surface of said partition wall in a horizontal direction until joining said first passageway.

12. The hydraulic damping device according to claim 10, wherein said valve means has a fan-shaped cross-section and is driven to turn about a pivot thereof, and an arc-shaped outer peripheral portion of said valve means changes an amount of opening of each of said first passageway and said second passageway.

13. The hydraulic damping device according to claim 7, further comprising:
   a base plate; and
   a side plate,
   said second member being composed of a cylindrical, thick-walled, elastic rubber body which is secured to said side wall of said cylindrical housing through said base plate, said base plate being composed of a cylindrical, thick-walled, elastic rubber body which is secured to said side wall of said cylindrical housing through said base plate,
   said base plate having surfaces defining a through-hole, said through-hole being concentric with said cylindrical, thick-walled, elastic rubber body,
   said side plate being secured to an open end of said cylindrical, thick-walled, elastic rubber body so as to cover said open end,
   a projecting portion being formed in each of said base plate and said side plate so as to project toward an opposed plate surface of each of said base plate and said side plate,
   an end of each projecting portion being spaced apart from said opposed plate surface by a predetermined distance.

14. The hydraulic damping device according to claim 13, further comprising an upper plate secured to a top surface of said first member, said upper plate being integrally coupled with said side plate, said side plate being secured to said open end of said cylindrical elastic rubber body by a coupling member, thereby supporting a vibration body.

15. The hydraulic damping device according to claim 14 wherein a stopper rubber member is provided on a lower surface of said coupling member.

16. The hydraulic damping device according to claim 1, wherein said valve means includes first and second valve members, said first valve member changing the opening of said first passageway, said second valve member changing the opening of said second passageway.

* * * * *